(12) United States Patent
Eriksson et al.

(10) Patent No.: US 10,129,319 B2
(45) Date of Patent: Nov. 13, 2018

(54) USE OF WEBRTC APIS FOR IMPROVING COMMUNICATION SERVICES

(71) Applicant: Telefonaktiebolaget L M Ericsson (publ), Stockholm (SE)

(72) Inventors: Göran Eriksson, Norrtälje (SE); Stefan Håkansson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 182 days.

(21) Appl. No.: 14/774,048

(22) PCT Filed: Mar. 12, 2013

(86) PCT No.: PCT/SE2013/050219
§ 371 (c)(1),
(2) Date: Sep. 9, 2015

(87) PCT Pub. No.: WO2014/142715
PCT Pub. Date: Sep. 18, 2014

(65) Prior Publication Data
US 2016/0028790 A1    Jan. 28, 2016

(51) Int. Cl.
*G06F 15/16* (2006.01)
*H04L 29/06* (2006.01)
(Continued)

(52) U.S. Cl.
CPC ........ *H04L 65/608* (2013.01); *H04L 65/1069* (2013.01); *H04L 65/607* (2013.01);
(Continued)

(58) Field of Classification Search
CPC .............. H04L 65/608; H04L 65/1006; H04L 65/1016; H04L 67/141; H04L 51/04; H04L 49/206
See application file for complete search history.

(56) References Cited

U.S. PATENT DOCUMENTS

2006/0230161 A1* 10/2006 Bae ...................... H04L 65/1083
709/228
2010/0191829 A1* 7/2010 Cagenius ............ H04L 12/2834
709/219
(Continued)

FOREIGN PATENT DOCUMENTS

WO    WO 2005/015935 A1    2/2005

OTHER PUBLICATIONS

International Search Report and Written Opinion of the International Searching Authority, Application No. PCT/SE2013/050219, dated Jun. 26, 2013.
(Continued)

*Primary Examiner* — Tauqir Hussain
*Assistant Examiner* — Kamran Mohammadi
(74) *Attorney, Agent, or Firm* — Sage Patent Group

(57) ABSTRACT

Devices, server nodes and associated methods related to communication services applying webRTC are disclosed. The method performed by a device includes creating an RTCPeerConnection object and instructing the RTCPeer-Connection object to create a RTCSessionDescription, SDesc_1, for a session containing audio and video components. The method further includes determining which capabilities that are supported by the device based on information in the SDesc_1, and further indicating information related to the determined capabilities to a first user on a user interface. A first user, when using the service, is enabled to select a type of user communication, based on the indicated information, that can be provided by the device.

28 Claims, 9 Drawing Sheets

(51) Int. Cl.
 *H04L 29/08* (2006.01)
 *H04N 19/44* (2014.01)
(52) U.S. Cl.
 CPC ............ *H04L 67/02* (2013.01); *H04L 67/104* (2013.01); *H04N 19/44* (2014.11)

(56) References Cited

U.S. PATENT DOCUMENTS

2010/0235550 A1  9/2010  Bolton et al.
2014/0161241 A1* 6/2014  Baranovsky ............ H04M 3/51
                                              379/142.05

OTHER PUBLICATIONS

Bergkvist et al. "WebRTC 1.0: Real-time Communication Between Browsers" (W3C Editor's Draft Jun. 11, 2015), retrieved Sep. 7, 2015 from http://dev.w3.org/2011/webrtc/editor/webrtc.html, 89 pp.
Kaplan et al., "API Requirements for WebRTC-enabled Browsers—draft-kaplan-rtcweb-api-reqs-01.txt", Internet Engineering Task Force (IETF), Network Working Group, Internet Draft, Intended Status: Informational, Expires: Apr. 31, 2012, Oct. 31, 2011, 13 pp.
Lamouri, "The Network Information API" (W3C Working Group Note Apr. 10, 2014), retrieved Sep. 7, 2015 from http://dvcs.w3.org/hg/dap/raw-file/tip/network-api/Overview.html, 2 pp.
Leithead, "Proposal: Media Capture and Streams Settings API v6" (Edit's Draft Dec. 12, 2012), retrieved Sep. 7, 2015 from http://dvcs.w3.org/hg/dap/raw-file/tip/media-stream-capture/proposals/SettingsAPI_proposal_v6.html, 22 pp.
"Media Captures and Streams", retrieved Sep. 7, 2015 from http://w3c.github.io/mediacapture-main/getusermedia.html, 46 pp.
Nandakumar et al., "SDP for the WebRTC—draft-nandakumar-rtcweb-adp-00.txt", Internet Engineering Task Force (IETF), Network Working Group, Internet-Draft, Intended Status: Informational, Expires: Apr. 18, 2013, Oct. 15, 2012, 35 pp.
Rosenberg, "Interactive Connectivity Establishment (ICE): A Protocol for Network Address Translator (NAT) Traversal for Offer/Answer Protocols", Internet Engineering Task Force (IETF), Request for Comments: 5245; Obsoletes: 4091, 4092; Category, Standards Track, Apr. 2010, 117 pp.
Uberti et al., "Javascript Session Establishment Protocol—draft-ietf-rtcweb-jsep-01.txt", Internet Engineering Task Force (IETF), Network Working Group, Internet-Draft, Intended Status: Standards Track, Expires: Dec. 6, 2012, Dec. 6, 2012, 31 pp.

* cited by examiner

USE OF WEBRTC APIS FOR IMPROVING COMMUNICATION SERVICES

CROSS REFERENCE TO RELATED APPLICATION

This application is a 35 U.S.C. § 371 national stage application of PCT International Application No. PCT/SE2013/050219, filed on Mar. 12, 2013, the disclosure and content of which is incorporated by reference herein in its entirety. The above-referenced PCT International Application was published in the English language as International Publication No. WO 2014/142715 A1 on Sep. 18, 2014.

TECHNICAL FIELD

The herein suggested solution relates generally to communication services, and in particular to enabling adaption of a communication service applying WebRTC to capabilities associated with at least one device.

BACKGROUND

In IETF (Internet Engineering Task Force) and W3C (World Wide Web Consortium) there is an ongoing effort aiming to enable support of conversational audio, video and data in a so-called "web browser". Within this effort, WebRTC (Web Real-Time Communication) is an API definition being drafted by the W3C to enable browser-to-browser applications for voice calling, video chat and P2P (Peer to Peer) data sharing without plugins. That is, WebRTC could be used in/by a web application in order to provide conversational services to users. By use of WebRTC and the associated APIs (Application Programming Interfaces), a web browser will be able to send and receive e.g. RTP (Real-time Transport Protocol) and SCTP (Stream Control Transmission Protocol) data, and to get input samples from microphones and cameras connected to a user device, and to render media, such as audio and video. A web browser which is to provide conversational services by use of WebRTC, is controlled by a web (html) page via JS (Java Script) APIs, and, by html elements for rendering.

Examples of defined APIs associated with WebRTC are:
1. NavigatorgetUserMedia( ) (defined in [1]): gives a web application, after user consent, access to media generating devices such as microphones and cameras.
2. RTCPeerConnection (defined in [2]): an object that enables the web application to stream data from media generating devices to a peer.
3. RTCSessionDescription (defined in [2]): objects that are used to control the RTCPeerConnection objects.

The default use of the APIs described above in a web page or web application will be described below. When an end user has initiated a communication session in a web application associated with a communication service, the following is performed:
1. Using navigator.getUserMedia( ) to get allowance (active consent) from the user to use the microphone and the camera of the user's device
2. Creating a RTCPeerConnection (PC) object to handle a connection to a remote peer, and the transmission/reception of audio and video to/from the remote peer.
3. Instructing the PC to use the audio and video data created by microphone and camera, which is accessed with user consent after using navigator.getUserMedia( ), as source for media to be sent to a peer using the PC.
4. Instructing the PC object to create, and use, an RTCSessionDescription object that is used to describe the intended session.
5. Signaling the RTCSessionDescription data to the remote peer, which in its turn uses navigator.getUserMedia( ) to get user consent, creates a PC, instructs the PC to use audio/video from microphone/camera, applies the received RTCSessionDescription and generates a new RTCSessionDescription in response to the received RTCSessionDescription.
6. Receiving the RTCSessionDescription from the remote peer and applying it locally.
7. Starting the sessions, in which audio and video can flow between the peers.

In addition to these APIs having the functions described above, extensions have recently been proposed (see [3]). One of the extensions enables a web application to create unattached media stream tracks. Unattached in the sense that there is no real source delivering data. Such an unattached media stream track could be made "real", e.g. in order to be the source for transmission of real media data, by using the Navigator.getUserMedia( ) API to connect a media generating device to the unattached stream track, which then will cease to be an unattached media stream track.

SUMMARY

The use of services applying WebRTC may be associated with negative user experiences related e.g. to that a user is presented with service alternatives which are, in fact, not available. It is therefore desirable to enable a correct presentation of service alternatives to a user, and thereby enable an improved user experience. According to the herein suggested solution, WebRTC APIs are utilized in a new, unexpected way which enables a more correct presentation of service alternatives to a user as compared to prior art solutions. The solution enables service providers using WebRTC as a platform for communication services to offer services giving a better user experience. The suggested solution is defined by the appended claims.

According to a first aspect, a method is provided which is to be performed by a device in a communication network. The device is assumed to be operable to implement WebRTC and to be associated with a service applying WebRTC. The device is further assumed to be operable to be associated with a first user being connected to the service. The method comprises creating an RTCPeerConnection object and instructing the RTCPeerConnection object to create a RTCSessionDescription, SDesc_1, for a session containing audio and video components (without accessing real media data). The method further comprises determining which capabilities that are supported by the device based on information in the SDesc_1, and further indicating information related to the determined capabilities to the first user on a user interface. Thereby, the first user is enabled, when using the service, to select a type of user communication, based on the indicated information, that can be provided by the device.

According to a second aspect, a device is provided, which is operable in a communication network. The device is further operable to implement WebRTC and to be associated with a service applying WebRTC. The device is further operable to be associated with a first user being connected to the service. The device comprises a WebRTC control unit, adapted to create an RTCPeerConnection object, and further adapted to instruct the RTCPeerConnection object to create an RTCSessionDescription, SDesc_1. The device further comprises a determining unit, adapted to determine which capabilities that are supported by the device based on information in the SDesc_1. The device further comprises an indicating unit, adapted to indicate information related to the determined capabilities to the first user on a user interface, thus enabling the first user, when using the service, to select a type of user communication, based on the indicated information, that can be provided by the device.

According to a third aspect, a method is provided, which is to be performed by a server node in a communication network. The server node is assumed to be operable to implement WebRTC and to be associated with a service applying WebRTC. The method comprises receiving a first RTCSessionDescription, SDesc_1, from a first device associated with a first user connected to the service. The method further comprises receiving a second RTCSessionDescription, SDesc_2, from a second device associated with a second user connected to the service. The method further comprises determining information related to capabilities supported by both the first device and the second device based on SDesc_1 and SDesc_2, and indicating the determined information to at least one of the first and the second device.

According to a fourth aspect, a server node is provided, which is operable in a communication network. The server node is operable to implement WebRTC and to be associated with a service applying WebRTC. The server node comprises a receiving unit, adapted to receive a first RTCSessionDescription, SDesc_1, from a first device associated with a first user connected to the service; and further adapted to receive a second RTCSessionDescription, SDesc_2, from a second device associated with a second user connected to the service. The server node further comprises a determining unit, adapted to determine information related to capabilities supported by both the first device and the second device based on SDesc_1 and SDesc_2. The server node further comprises an indicating unit, adapted to indicate the determined information to at least one of the first and the second device.

According to a fifth aspect, a computer program is provided, which comprises computer readable code means, which when run in a device causes the device to perform the method according to the first aspect.

According to a sixth aspect, a computer program product is provided, which comprises a computer program according to the fifth aspect.

According to a seventh aspect, a computer program is provided, which comprises computer readable code means, which when run in a server node causes the server node to perform the method according to the third aspect.

According to an eighth aspect, a computer program product is provided, which comprises a computer program according to the seventh aspect.

BRIEF DESCRIPTION OF THE DRAWINGS

The above, as well as additional objects, features and advantages of the suggested solution, will be better understood through the following illustrative and non-limiting detailed description of embodiments, with reference to the appended drawings, in which.

DETAILED DESCRIPTION

Figure 1:
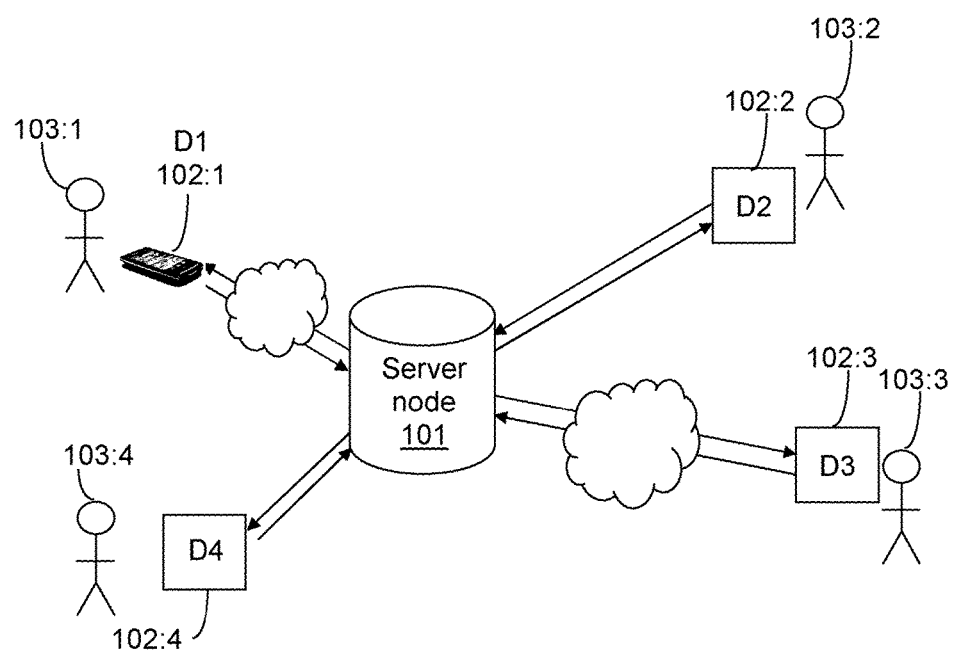
FIG. 1 illustrates a schematic communication network comprising a number of user devices and a server node, in which the suggested solution may be applied.

FIG. 1 illustrates a schematic communication network in which the herein suggested solution may be applied. The illustrated communication network comprises a server node 101 and a number of devices 102:1-102:4, each associated with a user 103:1-103:4, respectively. The devices are connected to the server node e.g. via the Internet. Examples of devices may be e.g. User Equipments (UEs), tablets or computers connected to the Internet e.g. via a wireless communication network, such as an LTE-type system, or a wired alternative, e.g. via VDSL2 over copper cables. The users 103:1-103:4 are assumed to be connected to a service applying WebRTC. A user connects to the service from her/his device, e.g. in a web browser, and is assumed to have a set of selected other users e.g. in a contact list. The other users in the contact list may be e.g. friends, family or work acquaintances, with which the user wishes to communicate from time to time. The service is a real time communication service, which may provide different combinations of real time user communication, such as e.g. video (visual), audio and chat. The devices may be differently equipped for user interaction, in form of displays, loudspeakers, microphones, cameras, keyboards and touch screens, etc.

An exemplifying set-up where the herein suggested solution is envisaged to be used in association with a communication service may be described as follows: Users of the service log on to the service from their respective locations and devices. The log on can be automatic, or manual, and take place e.g. when the device or browser is started, or, as a deliberate action from the user. When a user logs on, the user is registered with the service as being connected and "available" for communication. The user can from this stage see, on a user interface such as a display or touch screen, what other users, e.g. in a contact list, that are present, i.e. connected and available for communication via the communication service. Later, when the user either wants to start a communication session, using the service, with one or more other users, or if another user wants to start a communication session with this user, a session is set up between the users in question.

It has been realized by the inventors, that when using the WebRTC solution, as described above and defined e.g. in [1] and [2], users will be given the impression that a communication session with another party (peer) involving audio, video and data can be initiated, even when this is not the case. This may lead to that users are disappointed when a requested service cannot be provided, which gives a bad user experience, and thus a bad impression of the service.

In order to solve this problem, a solution is suggested herein, where the existing WebRTC APIs are utilized in a clever manner, such that a user may be presented with only those alternatives for communication that can actually be provided by the user's device, and possibly also by the device of another user with which the user will want to communicate. An embodiment of the suggested solution also utilizes the existing WebRTC APIs in combination with a recently proposed API for creation of unattached media stream tracks [3] to enhance the service and the user experience of the service.

The solution according to the embodiments enables a web application, applying WebRTC for providing communication service, to determine, before indicating available communication types to the user, what kind of communication that might be possible to establish, e.g. with other users of the service. For example, the solution may be used in order to present appropriate service alternatives to a user on a User Interface (UI).

Alternatively, the service provider can use the suggested solution to acquire, and reserve resources needed, to provide the communication types wanted. As an example, video transcoding resources could be reserved.

This suggested solution can be used in combination with information, such as e.g. knowledge about which networks that are available to different devices or nodes in the communication network, and possibly their expected capacity; knowledge of IP address assignment and/or of to which type of network different IP addresses belong. Further, the suggested solution could be used together with other data or information, such as knowledge about previous sessions using a certain IP address, e.g. monitored empirical data; or together with knowledge about previous sessions in a current location, which knowledge could be acquired using e.g. the geolocation web API. Further, changes in network conditions may be estimated using e.g. a combination of clever use of the available APIs in combination with use of information regarding networks, earlier sessions, etc. Such information could be collected and stored in a database.

Below, exemplifying procedures according to the suggested solution will be described in detail. Different actions associated with the solution are presented and explained. For example, existing APIs are used in a new way, together with new functionality being non-WebRTC functionality, i.e. not belong to the WebRTC definitions. The suggested solution aims at enabling e.g. an improved user experience in association with services applying WebRTC. A conventional use of the WebRTC APIs has been described earlier. Below, the new use of the APIs will be described. Further, in the description below, "ICE" will be mentioned. ICE (Interactive Connectivity Establishment) is a part of WebRTC, described e.g. in [5], which is used for two purposes: One is to establish connectivity, even in presence of NATs (Network Address Translators) and FWs (Fire Walls), between network nodes/devices employing the WebRTC API definition, or "standard". The other is to verify that the two network nodes/devices, with or without user involvement, consent to establishing connectivity. "ICE candidate" in this document means a "CANDIDATE" in [5], which in turn is a transport address, or in other words a combination of IP address and port. In short, ICE is a two stage process. First the two end-points that want to establish connectivity gather possible transport addresses (ICE candidates), and in the second stage the two end-points try to establish connectivity using the gathered ICE candidates in a systematic order.

According to an exemplifying embodiment of the suggested solution, the WebRTC APIs mentioned earlier are used to check the capabilities of the device and/or browser of the end user in conjunction with the registration process. Such an embodiment could be described as follows 1. Creating a media stream with unattached audio and video tracks using the API available in [3];
2. Creating a RTCPeerConnection (PC) object;
3. Instructing the PC object to use the created media stream (with unattached tracks) as source for media;
4. Instructing the PC object to create a RTCSessionDescription object that is used to describe the intended session;
    Note1: The PC object can be used in different ways, e.g the RTCSessionDescription object can be populated with only a fraction of the eventual ICE candidates, with subsequent ICE candidates being made available as objects on their own, or it can contain the full ICE candidate list. For this document it does not matter whether the ICE candidates are present immediately or comes as separate objects with some delay—it is in that case assumed that they are added to the RTCSessionDescription object.
    Note2: If step 3 is not done; the PC is instructed to create an RTCSessionDescription object indicating that audio and video is intended to be part of the session by using certain constraints
5. Parsing the RTCSessionDescription to determine capabilities of the user device and/or browser, such as e.g. which codecs that are supported, and which network interfaces that are present. The inventors have realized that these are accessible due to the ICE procedure (see [5]), which is started when creating an RTCSessionDescription.
6. Utilizing the information from the RTCSessionDescription and information from an RTCSessionDescription associated with another user to determine what capabilities that can be supported in a session with the other user.

Note that the above sequence does not involve use of the API navigator.getUserMedia( ). This way, the user is never asked to give the web application access to camera and microphone, and the camera or microphone is never switched on (and no "hot" indicator is ever lit up). Doing any of this would give the user a feeling of privacy infringement: "why is this web app (trying to) using my camera, I have no intention to have a communication session right now".

In an alternative exemplifying embodiment, where an API for creating unattached media stream tracks is not available, the procedure could be implemented and/or described as follows:

1. Creating a RTCPeerConnection (PC) object.
2. Instructing the PC object to create a RTCSessionDescription object that is used to describe the intended session. The constraints "OfferToReceiveAudio" and "OfferToReceiveVideo" should be used when doing this, when appropriate, in order to indicate that the intention is to have audio and video in the session.
3. Parsing the RTCSessionDescription to determine the capabilities of the user device and/or browser, such as e.g. which codecs that are supported, and which network interfaces that are present. The inventors have realized that these are accessible due to the ICE procedure (see [5]), which is started when creating an RTCSessionDescription.
4. Utilizing the information from the RTCSessionDescription and information from an RTCSessionDescription associated with another user to determine what capabilities that can be supported in a session with the other user. For example, determining which capabilities that are supported by both the device and/or browser associated with the first user and the device and/or browser associated with the second user. Such overlapping capabilities can be used for communication between the users, i.e. in a session between the peers.

The information which is derivable from an RTCSessionDescription when the procedure involves an unattached media stream track will be more detailed than when no unattached media stream track is involved.

From an RTCSessionDescription generated by the RTCPeerConnection object, the following information can be derived:

Audio codecs/formats supported—including features, level and profiles within the codecs/formats.

Video codecs/formats supported—including features, level and profiles within the codecs/formats.

What types of network interfaces that are available (e.g. based on IP addresses obtained from the ICE candidates)

By using the information from the RTCSessionDescription in a clever way, a communication service can present e.g. appropriate icons to users, in order to give them the right expectations in regard of achievable communication types. For example, a set of rules could comprise the following:

If there are overlapping formats for both audio and video for two peers (users/devices), and if the network interfaces between the peers support higher bitrates: show an icon on the user interface indicating that a video session with the other peer is possible.

If the audio formats of two peers (users/devices) are overlapping, but there is no common video format: show an icon on the user interface indicating that an audio-only session with the other peer is possible (i.e. no video).

If common formats for audio and video are available for two peers, but the network interfaces available to one or both peers will not (based on experience or other information) support the bitrates required for video: show an icon indicating that an audio-only (i.e. not video) session is possible with the other peer.

By examining the ICE candidates and compare with known data determine whether a communication is likely to be possible or not. A clarifying example: if you find out that the WebRTC node is behind a firewall that is known to block communication, communication with nodes outside it is probably not possible for that node.

Examine the RTP (Real-time Transport Protocol) features supported, and if known middleboxes will not interoperate with those features, indicate that communication will not be possible with the other peer.

Further, e.g. when a communication session is being set up, the user interface can be adapted in an appropriate manner. For example, no video surface may be present if no video session will be possible, a small video surface may be present if it is determined that the video codecs and their profiles in common would only allow a low resolution video session, or if it is determined that the network connection can only support lower bitrates, etc.

Exemplifying Method Performed by a Device, FIGS. 2a, 2b and 3-4

Figure 2A:
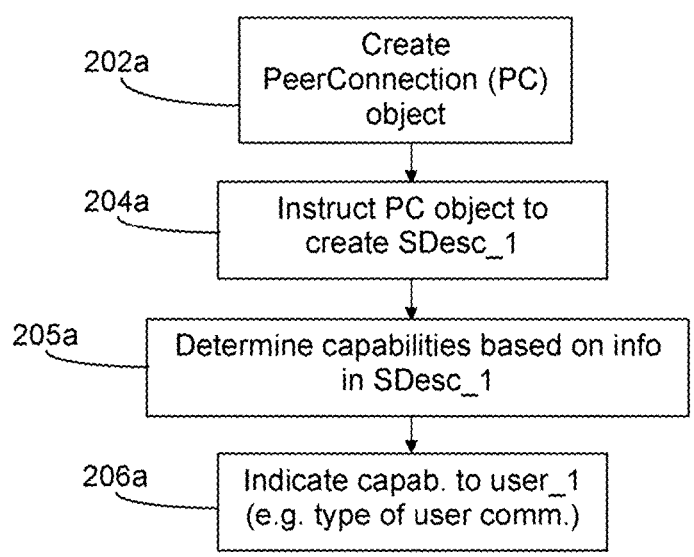
FIGS. 2a, 2b and 3-4 are flow charts illustrating exemplifying procedures performed by a device according to exemplifying embodiments.

An exemplifying method performed by a device in a communication network will be described below with reference to FIG. 2a and will be further exemplified with reference to FIGS. 2b-4. The device is operable to implement WebRTC and further operable to be associated with a service applying WebRTC. The device is further operable to be associated with a first user being connected to the service.

The method comprises creating, in an action 202a, an RTCPeerConnection object. That is, using a WebRTC API for creating an RTCPeerConnection object. The method further comprises instructing, in an action 204a, the RTCPeerConnection object to create an RTCSessionDescription, SDesc_1, for a session containing audio and video components. This could alternatively be described as that the method comprises creating an RTCSessionDescription, SDesc_1. It should be noted that no user consent is needed in association with performing the method, since no real media stream is associated with the RTCPeerConnection object or SDesc_1. In this way, a user does not need to give consent to use of camera, microphone etc. in a situation where the user has neither initiated a communication session with another user, nor received a request for communication session from another user.

The method further comprises determining, in an action 205a, which capabilities that are supported by the device based on information in the SDesc_1. In an implementation, the SDesc_1 is parsed for information related to capabilities supported by the device. This is possible, since it is realized that SDesc_1 comprises such information due to the ICE processing started when creating an RTCSessionDescription. In another implementation, the SDesc_1 is also or alternatively provided to, i.e. transmitted to, a server node, for further processing, e.g. comparison with SDescs associated with other devices. In this case information is received from the server node, which is related to information comprised in SDesc_1 (and probably related to information comprised in another SDesc). Detemining which capabilities that are supported by the device based on such information received from a server node is still considered to be "determining which capabilities that are supported by the device based on information in the SDesc_1".

Information related to the determined capabilities is then indicated to the first user on a user interface in an action 206a. The indicated information may be e.g. in form of an icon symbolizing a video camera when video communication is supported by the device, as previously described. Alternatively or in addition, the presence and size e.g. of a video area on the user interface may indicate whether video is available, and to which extent, e.g. at which resolution.

Figure 2B:
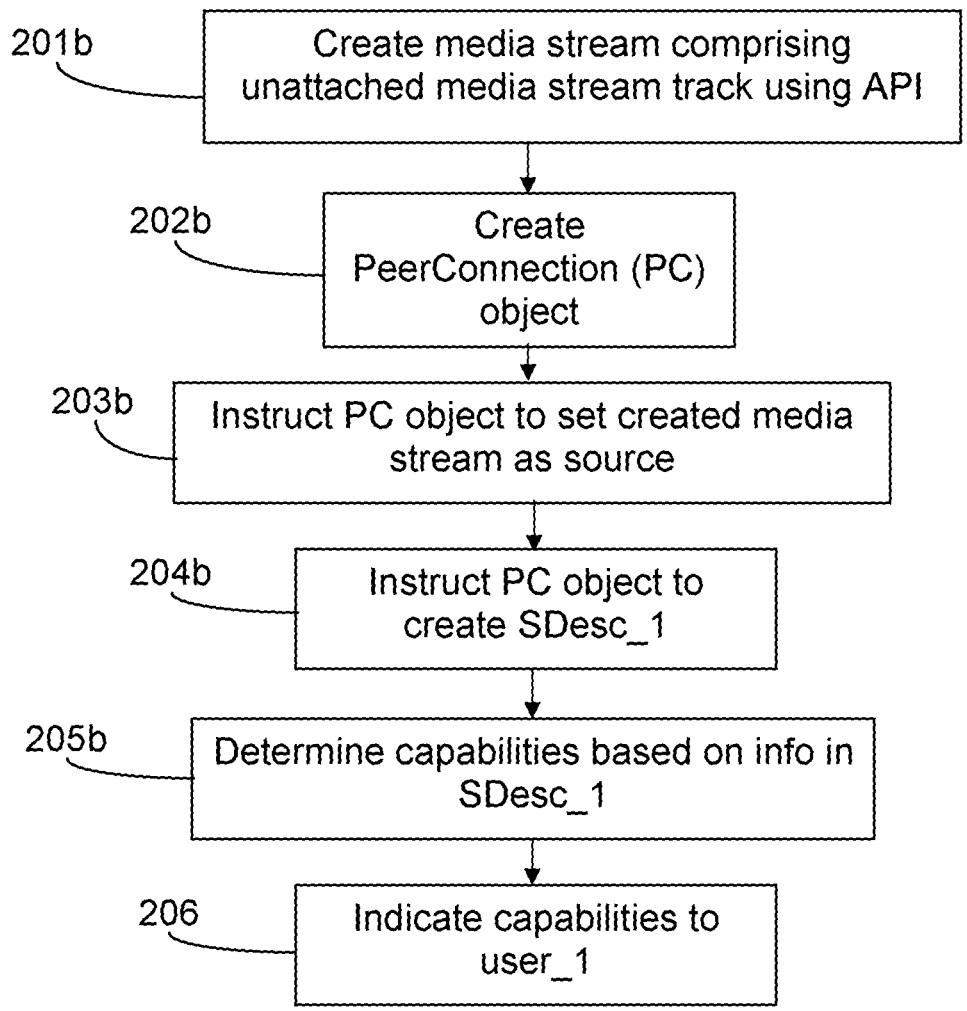

FIG. 2b shows an alternative embodiment of the above described method, also comprising the creation and use of a so-called unattached media stream track. The actions 202b and 204b-206b may be considered to correspond to the actions 202a and 204a-206a in FIG. 2a.

In the method illustrated in FIG. 2b, a media stream containing unattached media stream track(s) is created by use of a WebRTC API (described in reference [3]) in an action 201b. The unattached media stream track is not associated with access to any camera or microphone or similar equipment, and does thus not require use of the previously described API getUserMedia( ).

The method illustrated in FIG. 2b further comprises an action 203b, in which the created RTCPeerConnection object is instructed to set the media stream containing unattached media stream tracks as source for media.

By using the above described method, the first user, which is connected to the service, is enabled to select a type of service, i.e. user communication, e.g. video and audio or audio-only, which can actually be provided by the device. That is, a type of service for which the device supports the required capabilities, such as e.g. required type of codec/codecs and associated features/profiles/levels and supported network interfaces and IP addresses. In this way, the user will not be mislead to try to initiate a service which cannot be provided, and thus the disappointment associated with such an attempt is avoided. Consequently, the user experience is improved.

Figure 3:
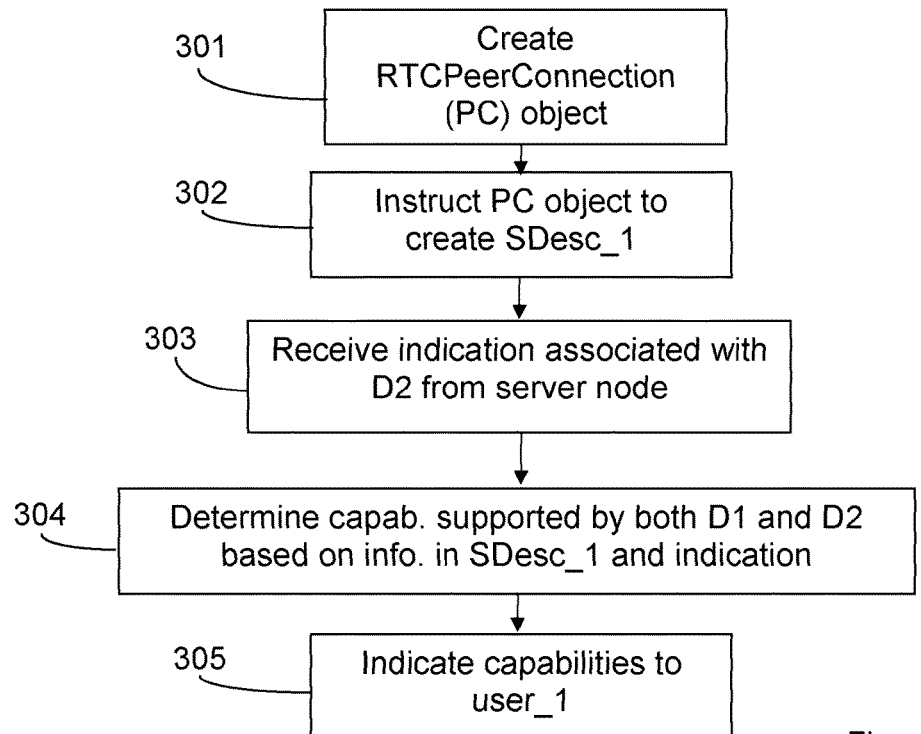

FIG. 3 illustrates a method which further comprises receiving an indication associated with another device D2 associated with a second user, the second user being present in e.g. a contact list of the first user and vice versa. The indication could e.g. be an RTCSessionDescription, SDesc_2, associated with the device D2, or parts thereof. The indication should comprise or indicate information enabling determining of which capabilities that are supported by both the device D1 and the device D2, based on SDesc_1 and the indication. This is illustrated as action 304 in FIG. 3. A media stream containing unattached media stream tracks could be used in the method illustrated in FIG. 3, as described in association with FIG. 2b.

Figure 4:
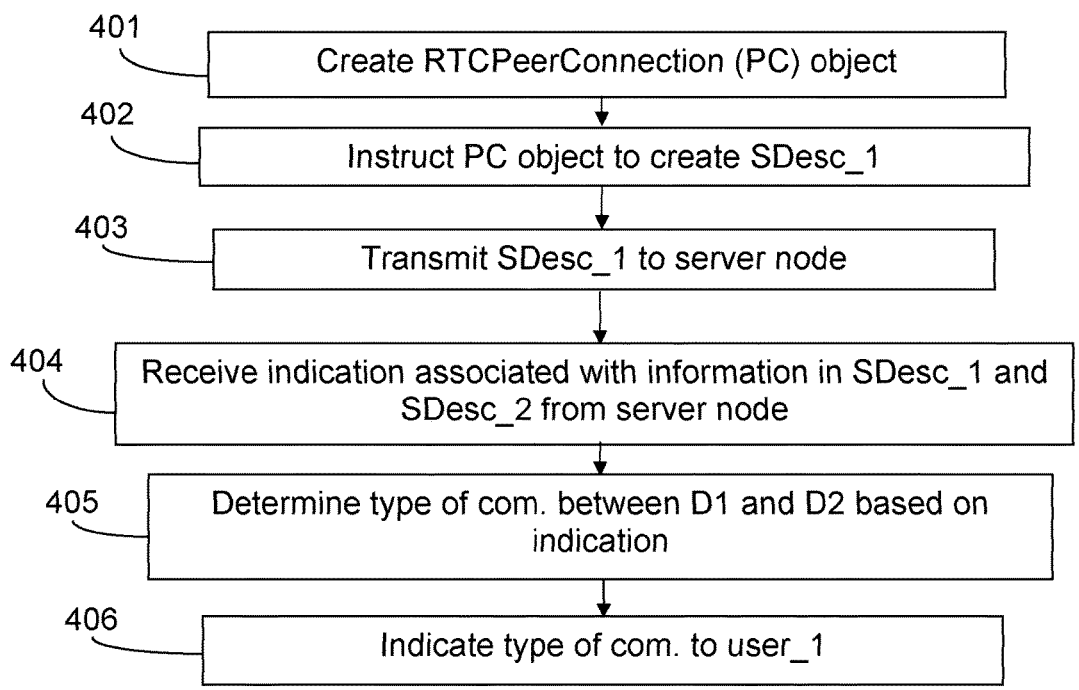

The created SDesc_1 may also or alternatively be provided, i.e. transmitted, to a server node, which also receives RTCSessionDescriptions from other devices associated with other users. Such an implementation is illustrated in FIG. 4, where the SDesc_1 is transmitted to the server node in an action 403. Then, an indication is received from the server node in an action 404, which indication is associated with information comprised in SDesc_1 and an RTCSessionDescription SDesc_2, associated with another device D2, associated with a second user present in e.g. the contact list of the first user, as above. The information may, as described above, be related to type of codec/codecs and associated features/profiles/levels, supported network interfaces and IP addresses. The indication may provide this information explicitly, or be an indicator e.g. of a certain type of service or capability supported by both devices, meaning that it would be possible to provide the indicated type of service between the two devices.

The capabilities, e.g. type of service, that are supported by both the device and the second device, D2, are determined in an action 405, based on the received indication. The determined capabilities may then be indicated to the first user on the user interface in an action 406. The determined capabilities may be indicated in association with an indication of the second user on the user interface, e.g. next to a symbol representing the second user in a contact list of the first user.

Figure 8:
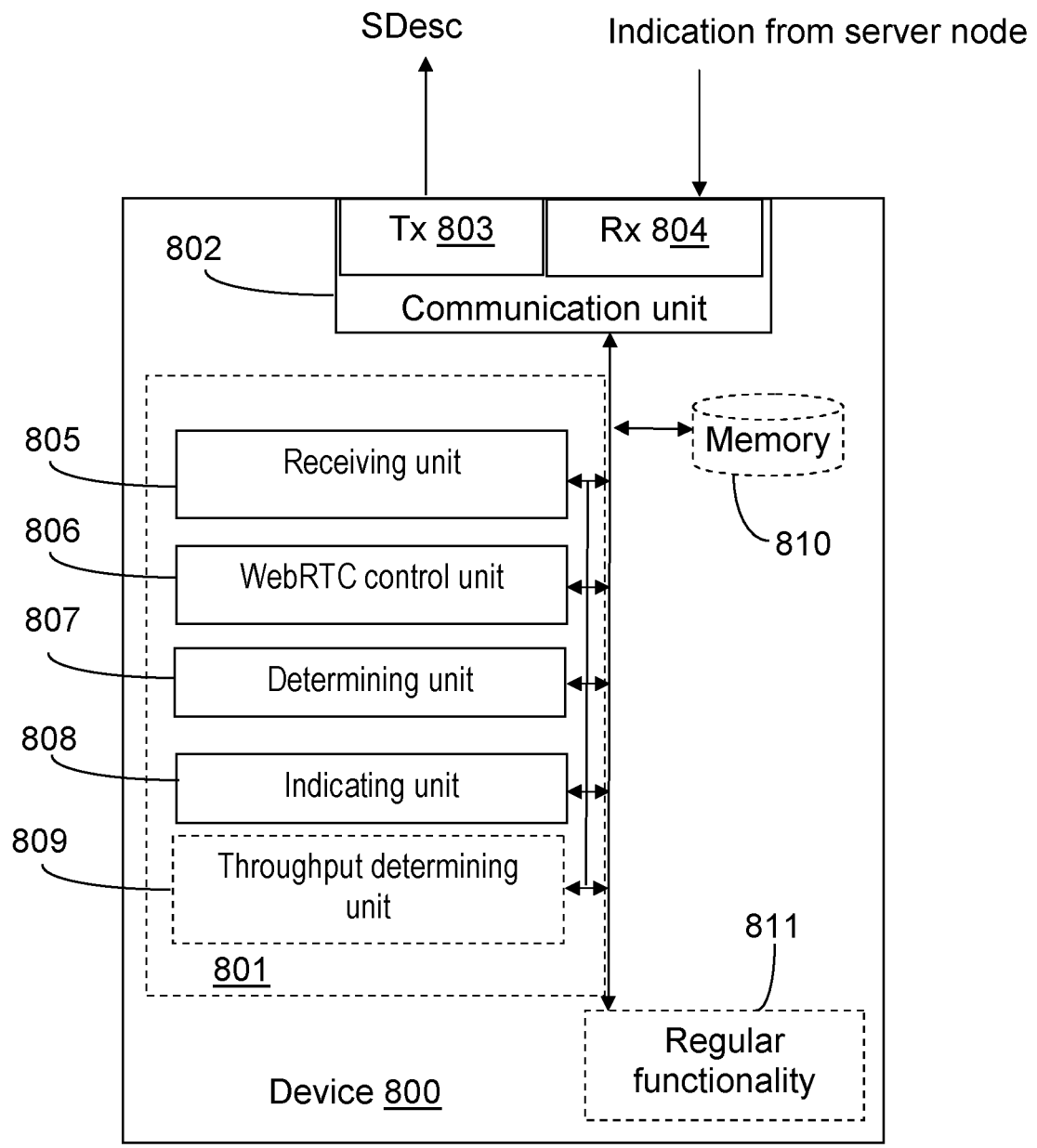
FIG. 8 is a block chart illustrating a device according to an exemplifying embodiment.

Exemplifying Device, FIG. 8

Below, an exemplifying device 800 adapted to enable the performance of at least one of the above described methods will be described with reference to FIG. 8. The device is operable in a communication network. For example, the device may be connected to a server node e.g. via the Internet. The device could be e.g. a User Equipment (UE), a tablet, a computer, or any other communication device available on the market, which is operable to implement WebRTC and to be associated with a service applying WebRTC, and further operable to be associated with a first user being connected to the service. The service could be accessed e.g. via a web browser run on the device. The device is assumed to have a user interface, e.g. in form of a touch screen, on which information may be presented to the user.

The device 800 is illustrated as to communicate with other entities or nodes via a communication unit 802, comprising means for wireless and/or wired communication, such as a receiver 804 and a transmitter 803. The device may comprise further functional units 811, such as a camera, a microphone, loudspeakers and a display unit, and signal processing circuits, such as codecs etc. The arrangement 801 and/or device 800 may further comprise one or more storage units 810.

The arrangement 801 and/or device 800, or parts thereof, could be implemented e.g. by one or more of: a processor or a micro processor and adequate software and memory for storing thereof, a Programmable Logic Device (PLD) or other electronic component(s) or processing circuitry configured to perform the actions described above.

The device 801, and arrangement 801, could be illustrated and described as comprising a webRTC control unit 806 adapted to create an RTCPeerConnection object, and further adapted to instruct the RTCPeerConnection object to create a RTCSessionDescription, SDesc_1. The device further comprises a determining unit 807, adapted to determine which capabilities that are supported by the device based on information in the SDesc_1. The capabilities may e.g. be types of real time user communication, such as video, audio and chat or data. The term "capabilities" may also refer to the technical equipment enabling different types of user communication, such as e.g. codecs and related settings, camera, microphone, etc.

The device further comprises an indicating unit 808, adapted to indicate information related to the determined capabilities to the first user on a user interface, e.g. on a display in graphical form. Thereby, the first user is enabled, when using the service, to select a type of user communication, based on the indicated information, that can be provided by the device.

The device, e.g. the WebRTC control unit 806, may be further adapted to create a media stream containing unattached media stream tracks by use of a WebRTC API, such as the one described in [3], and to instruct the RTCPeerConnection object to set the created media stream (with unattached tracks) as source for media. Normally, when applying WebRTC, a real media stream, i.e. from a camera and/or microphone, or similar, is set as source for media.

The device may further comprise a receiving unit 805, adapted to receive an indication from a server node, where the indication is associated with capabilities of a second device associated with a second user connected to the service. (The device previously denoted only "device" is here assumed to be the "first device"). In this case, the determining of which capabilities that are supported by the first device comprises determining which capabilities that are supported by both the first device and the second device based on the received indication. That is, the capabilities supported by the first and second device may be determined based on information derived directly from the SDesc_1 and on information derived from the indication, or, based only on information derived from the indication, which in such a case also should indicate the capabilities supported by the first device (in addition to indicating the capabilities supported by the second device).

The indicating unit may be adapted to indicate the information related to the capabilities determined to be supported by both the first and the second device to the first user in association with an indication of the second user on the user interface, such that the first user can conclude that the indicated information is related to communication with the second user, when using the service. For example, a graphical representation of a video camera may be displayed next to an image, or other representation, of the second user, in order to indicate that a video session is possible and supported by the first and second device.

Further, the device may comprise a throughput determining unit 809 adapted to, or otherwise be adapted to, determine a data throughput capacity between the device and a second device by establishing a data channel between the device and the second device; and to transmit and/or receive a test message over the established data channel. The data throughput between the device and the second device could then be determined based on information related to the transmitted and/or received test message. The previously described determining of which capabilities that are supported by the device may then further be based on the determined data throughput. Thus, it could be determined e.g. that even though the first and second device support a video session in terms of hardware and/or software, the data throughput between the first and second device is too low for enabling such a video session. Data throughput could be measured e.g. in bytes per time unit.

Figure 5:
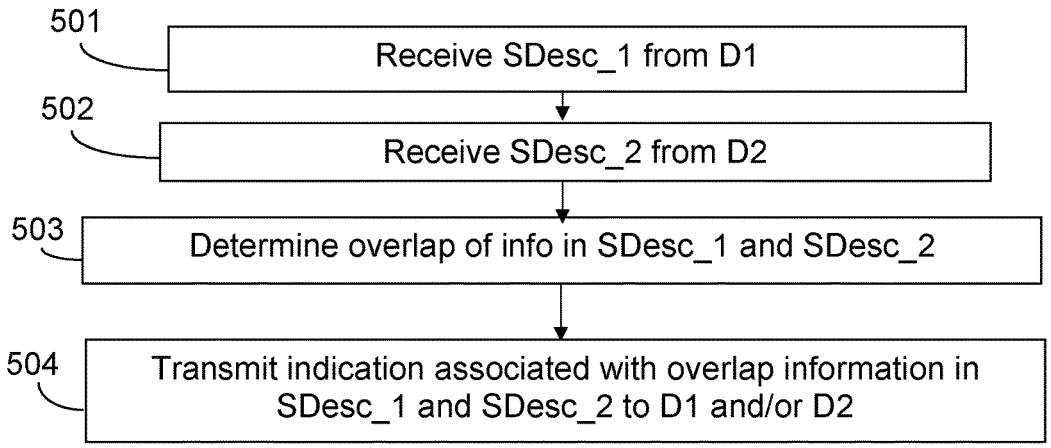
FIGS. 5-7 are flow charts illustrating exemplifying procedures performed by a server node according to exemplifying embodiments.
Figure 6:
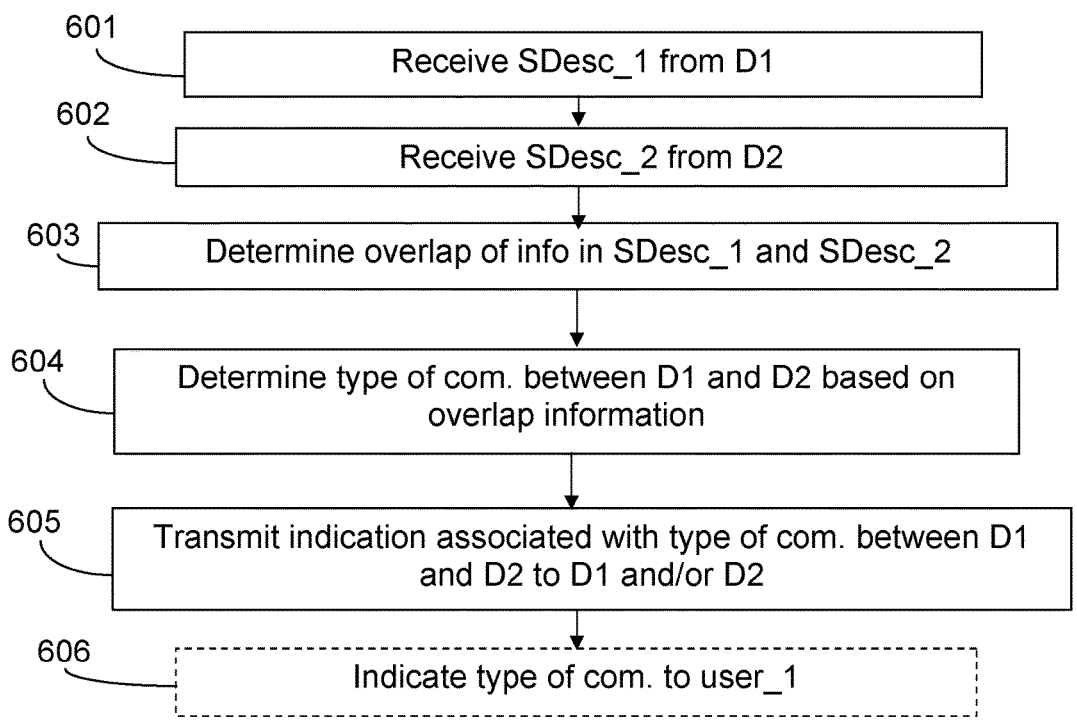
Figure 7:
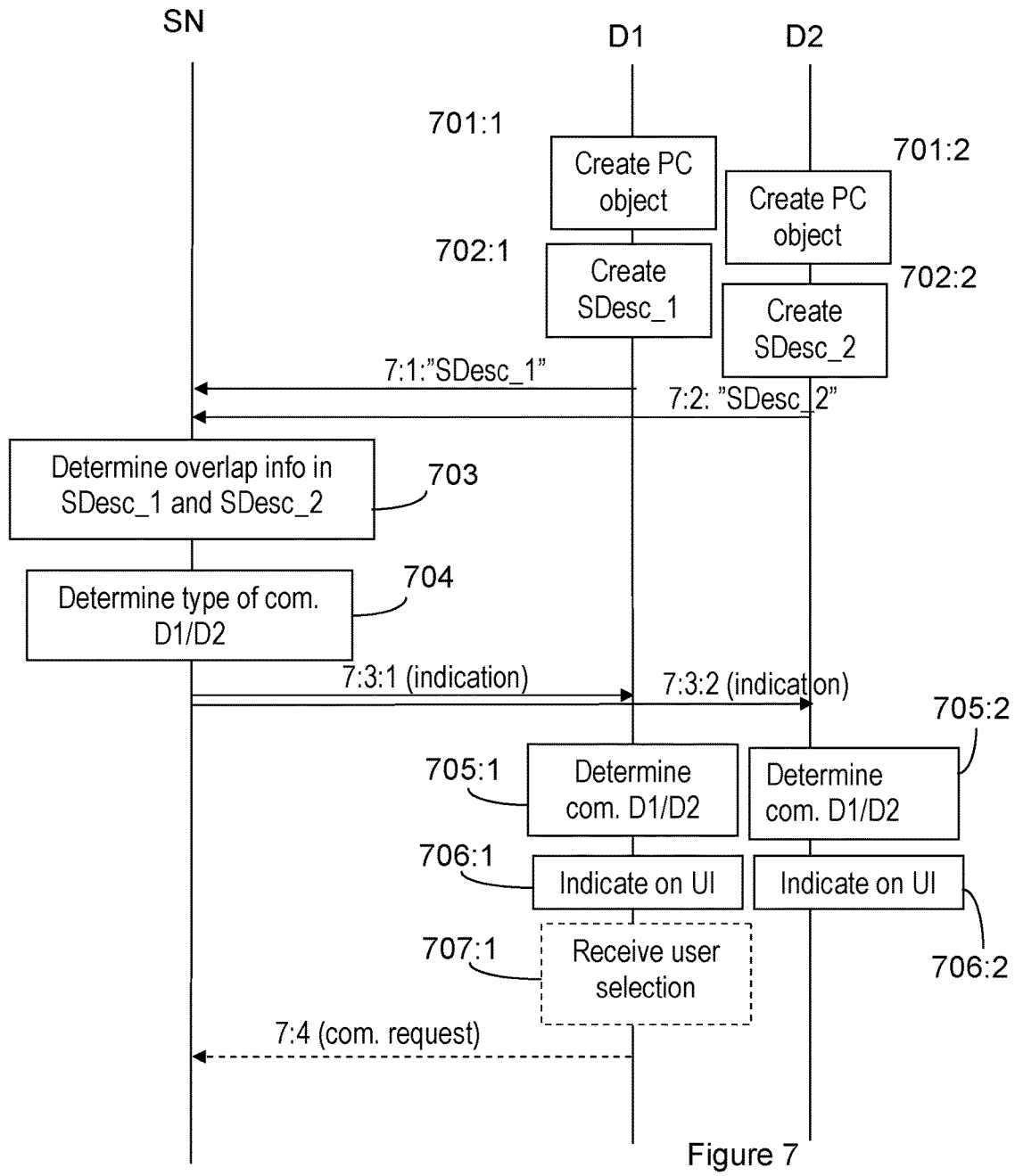

Exemplifying Method Performed by a Server Node, FIGS. 5-7.

An exemplifying method performed by a server node in a communication network, e.g. the Internet, will be described below with reference to FIG. 5 and will be further exemplified with reference to FIGS. 6 and 7. The server node is operable to implement WebRTC and further operable to be associated with a service applying WebRTC. Hence the server node provides the service applying WebRTC to devices which e.g. can access the server node via a browser and an Internet connection.

The method comprises receiving, in an action 501, a first RTCSessionDescription, SDesc_1, from a first device associated with a first user connected to the service. Further, the method comprises receiving, in an action 502, a second RTCSessionDescription, SDesc_2, from a second device associated with a second user connected to the service. Further, in an action 503, information is determined, which is related to capabilities supported by both the first device and the second device. The information is determined based on SDesc_1 and SDesc_2, e.g. by parsing of these. For example, the information may comprise the capabilities which overlap between the first and the second device, which is also used as an example in FIG. 5. The overlapping capabilities do not need to be explicitly stated in SDesc_1 and/or SDesc_2, but could be derived from by use of e.g. a mapping table mapping one or more characteristics stated in an RTCSessionDescription to one or more capabilities. Such a mapping table could be stored in a memory in the server node or elsewhere and thus be accessible for the server node.

The method further comprises indicating, in an action 504, the determined information to at least one of the first and the second device. The information could relate to one or more of: codecs supported by both the first and the second device;characteristics associated with codecs supported by both the first and the second device; network interfaces supported by both the first and the second device; and/or a type of real-time communication supported by both the first and the second device.

In FIG. 6, the actions 601-603 corresponds to the actions 501-503 in FIG. 5, but here is also illustrated an action 604, where a type of real time user communication supported by both the first and second device is determined based on overlapping information in SDesc_1 and SDesc_2. An indication of the type of real time user communication supported by both devices may be transmitted to e.g. the first device, which then may indicate this type of user communication to the first user on the user interface in an action 606. That is, the action 606 is not performed by the server node, but is illustrated in FIG. 6 in order to clarify the purpose of indicating information to the first and/or second device.

The interaction between the server node and a first device D1 and a second device D2 is further illustrated in FIG. 7, which is a signaling scheme.

Further, when it is determined that a certain capability is not supported by one of the first and the second device, i.e. is supported only by one of the devices, network functionality and capacity may be reserved to translate a capability supported by of one devices into a capability supported by the other device. For example when the first device supports a certain type of codec and the second device supports another type of codec, a transcoder in the network may be used to transcode the format of encoded data provided from the first device into a format decodable by the second device, and vice versa. Then,network functionality and capacity related to the transcoding may be reserved by the server node.

Figure 9:
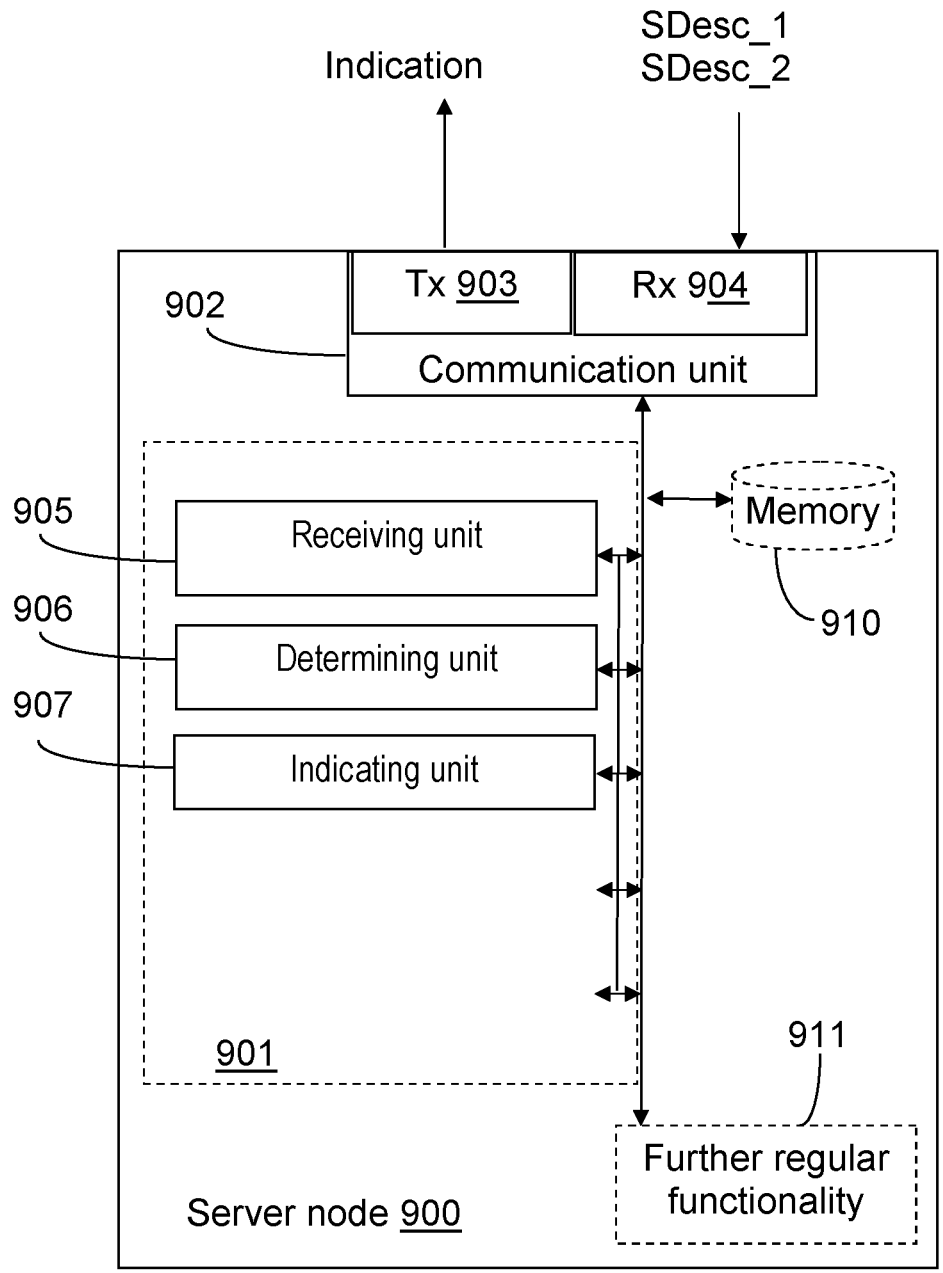
FIG. 9 is a block chart illustrating a server node according to an exemplifying embodiment.

Exemplifying Server Node, FIG. 9

Below, an exemplifying server node 900 adapted to enable the performance of the above described methods will be described with reference to FIG. 9. The server node is operable in a communication network, such as the Internet, and operable to implement WebRTC and to be associated with a service applying WebRTC. Hence the server node may provide the service applying WebRTC to devices which e.g. can access the server node via a browser and an Internet connection.

The device 900 is illustrated as to communicate with other entities or nodes via a communication unit 902, comprising means for wireless and/or wired communication, such as a receiver 904 and a transmitter 903. The server node may comprise further functional units 911 for providing regular server functions, and one or more storage units 910.

The arrangement 901 and/or server node 900, or parts thereof, could be implemented e.g. by one or more of: a processor or a micro processor and adequate software and memory for storing thereof, a Programmable Logic Device (PLD) or other electronic component(s) or processing circuitry configured to perform the actions described above.

The server node 900, and arrangement 901, could be illustrated and described as comprising a receiving unit 905, adapted to receive a first RTCSessionDescription, SDesc_1, from a first device associated with a first user connected to the service. The receiving unit 905 is further adapted to receive a second RTCSessionDescription, SDesc_2, from a second device associated with a second user connected to the service. The receiving unit 905, as well as other units described herein, may consist of or comprises a number of different units, components and/or circuits. The server node further comprises a determining unit 906, adapted to determine information related to capabilities supported by both the first device and the second device based on SDesc_1 and SDesc_2. This information could be determined, e.g. derived, by parsing of SDesc_1 and SDesc_2, comparing the information comprised in SDesc_1 and SDesc_2 and extracting certain predefined items when these items are found to overlap, e.g. be present, in both SDesc_1 and SDesc_2.

The server node further comprises an indicating unit 907, adapted to indicate the determined information to at least one of the first and the second device, as previously described.

The server node may further comprise functionality adapted to, when it is determined that a certain capability is not supported by one of the first and the second device, i.e. is supported only by one of the devices, network functionality and capacity may be reserved to translate a capability supported by of one devices into a capability supported by the other device, e.g. by transcoding between different audio and/or video formats.

Figure 10:
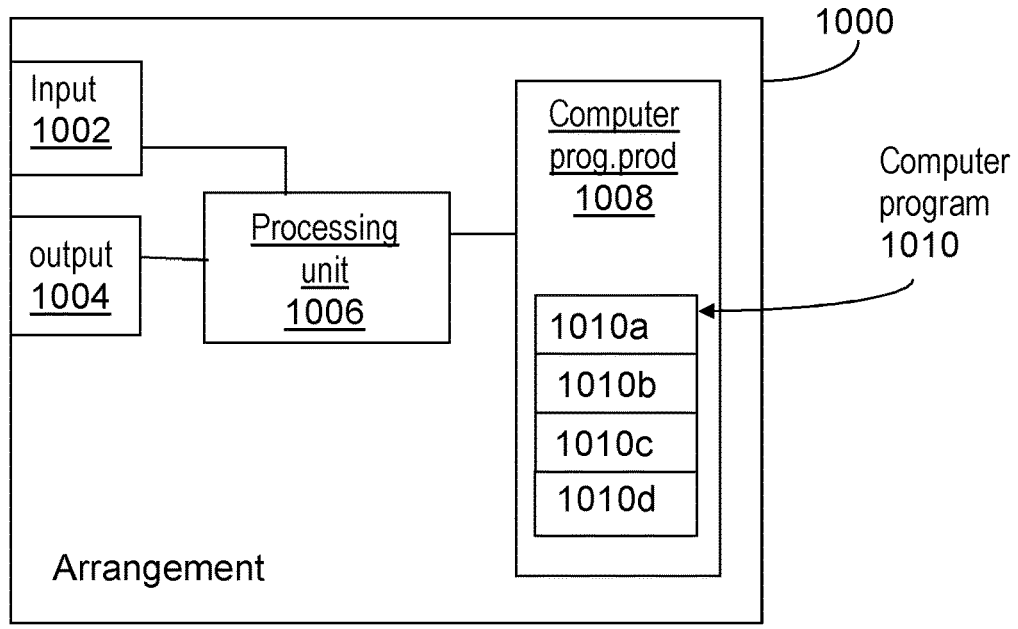
FIGS. 10 and 11 are block charts illustrating exemplifying computer implemented embodiments of an arrangement for use in a device and a server node, respectively.

Exemplifying Arrangement, FIG. 10

FIG. 10 schematically shows a possible embodiment of an arrangement 1000, which also can be an alternative way of disclosing an embodiment of the arrangement 801 in the device 800 illustrated in FIG. 8. Comprised in the arrangement 1000 are here a processing unit 1006, e.g. with a DSP (Digital Signal Processor). The processing unit 1006 may be a single unit or a plurality of units to perform different actions of procedures described herein. The arrangement 1000 may also comprise an input unit 1002 for receiving signals from other entities or nodes, and an output unit 1004 for providing signals to other entities or nodes. The input unit 1002 and the output unit 1004 may be arranged as an integrated entity.

Furthermore, the arrangement 1000 comprises at least one computer program product 1008 in the form of a non-volatile or volatile memory, e.g. an EEPROM (Electrically Erasable Programmable Read-Only Memory), a flash memory and a hard drive. The computer program product 1008 comprises a computer program 1010, which comprises code means, which when executed in the processing unit 1006 in the arrangement 1000 causes the arrangement and/or a device in which the arrangement is comprised to perform the actions e.g. of the procedure described earlier in conjunction with FIGS. 2a-b and 3-4.

The computer program 1010 may be configured as a computer program code structured in computer program modules. Hence, in an exemplifying embodiment, the code means in the computer program 1010 of the arrangement 1000 may comprise a WebRTC control module 1010a for create a RTCPeerConnection object, and for instructing the RTCPeerConnection object to create an RTCSessionDescription, SDesc_1. The arrangement 1000 may further comprise a determining module 1010b for determining which capabilities that are supported by the device based on information in the SDesc_1.

The computer program may further comprise anindicating module 1010c for indicating information related to the determined capabilities to the first user on a user interface. The computer program 1010 may further comprise one or more additional modules 1010d for providing other functions described above.

The modules 1010a-d could essentially perform the actions of the flows illustrated in FIGS. 2a-b and 3-4, to emulate the arrangement in the device illustrated in FIG. 8.

Figure 11:
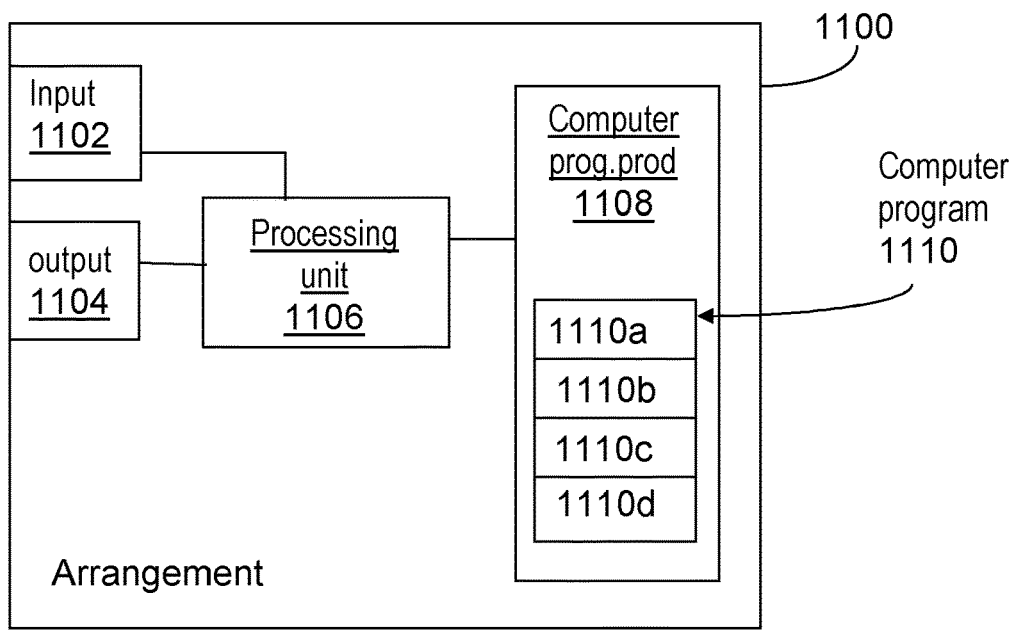

In a similar manner, FIG. 11 schematically shows a possible embodiment of an arrangement 1100, which also can be an alternative way of disclosing an embodiment of the arrangement 901 in the server node 900 illustrated in FIG. 9. The arrangement in FIG. 11 may be similar to the arrangement in FIG. 10, except that the computer program 1110 comprises different instructions than the computer program 1010. Hence, in an exemplifying embodiment, the code means in the computer program 1110 of the arrangement 1100 may comprise a receiving module 1010a for receiving RTCSessionDescriptions from a first and a second device connected to a service. The arrangement 1100 may further comprise a determining module 1110b for determining information related to capabilities supported by both the first device and the second device based on the received RTCSessionDescriptions.

The computer program may further comprise anindicating module 1110c for indicating the determined information to at least one of the first and the second device. The computer program 1110 may further comprise one or more additional modules 1110d for providing other functions described above.

Although the code means in the embodiment disclosed above in conjunction with FIGS. 10 and 11 are implemented as computer program modules which when executed in the processing unit causes the decoder to perform the actions described above in the conjunction with figures mentioned above, at least one of the code means may in alternative embodiments be implemented at least partly as hardware circuits.

As previously mentioned, the processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the device or server node.

While the methods and arrangements as suggested above have been described with reference to specific embodiments provided as examples, the description is generally only intended to illustrate the suggested solution and should not be taken as limiting the scope of the suggested methods and arrangements, which are defined by the appended claims. While described in general terms, the methods and arrangements may be applicable e.g. for different types of communication networks applying different Access Technologies.

The herein suggested solution may be used e.g. upon connecting to the communication service, at regular intervals and/or upon adding a user to a contact list. Performing the suggested solution at regular intervals would enable keeping the service up to date in regard e.g. of available network interfaces, etc. The suggested solution could be combined with the network API being defined in W3C [4] and/or with the geoLocation API defined by W3C in order to determine the location of a device. The suggested solution may be used in association with e.g. a database such that the info obtained from the use of the APIs as outlined here may be combined with other sources of info, e.g. statistics from previous service sessions.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. It should also be noted that the units or modules described in this disclosure are to be regarded as logical entities and not with necessity as separate physical entities.

ABBREVIATIONS

API Application Programming Interface
ICE Interactive Connectivity Establishment
IETF Internet Engineering Task Force
RTC Real-Time Communication
W3C World Wide Web Consortium

REFERENCES

[1] http://dev.w3.org/2011/webrtc/editor/getusermedia.html
[2] http://dev.w3.org/2011/webrtc/editor/webrtc.html

[3] http://dvcs.w3.org/hg/dap/raw-file/tip/media-stream-capture/proposals/SettingsAPI_proposal_v6.html
[4] http://dvcs.w3.org/hg/dap/raw-file/tip/network-api/Overview.html
[5] IETF RFC (Request for Comments): 5245, April 2010

The invention claimed is:

1. A method performed by a first device in a communication network, the first device being configured to implement WebRTC and to be associated with a WebRTC browser service applying WebRTC, the first device further being configured to be associated with a first user being connected to the WebRTC browser service, the method comprising:
   creating an RTCPeerConnection object to provide access to one or more unattached media stream sources of the first device, the one or more unattached media stream sources are not associated with access to an audio or multimedia device of the first device and do not require use of Application Programming Interfaces (APIs) associated with access to the audio or multimedia device of the first device;
   instructing the RTCPeerConnection object to create a RTCSessionDescription, SDesc_1, for a WebRTC browser session containing audio and video components from the one or more unattached media stream sources of the first device;
   determining one or more WebRTC browser session capabilities supported by the first device based on information in the SDesc_1;
   indicating information related to the determined one or more WebRTC browser session capabilities to the first user on a user interface of the first device;
   receiving, at the user interface, a selection by the first user of a type of user communication associated with the information to establish the WebRTC browser session with a second device associated with a second user being connected to the WebRTC browser service; and
   establishing the WebRTC browser session with the second device using the selected type of user communication, thus enabling the first user, when using the WebRTC browser service, to select a type of user communication, based on the indicated information, that can be provided by the first device during the WebRTC browser session with the second device,
   wherein the RTCPeerConnection object and the RTCSessionDescription, SDesc_1 object are Application Programming Interfaces (APIs) of the WebRTC browser service.

2. The method according to claim 1, wherein the SDesc_1 comprises information on one or more of:
   codecs supported by the first device;
   characteristics associated with codecs supported by the first device;
   IP addresses associated with the first device; and
   network interfaces supported by the first device.

3. The method according to claim 1, further comprising:
   receiving an indication from a server node, said indication being associated with one or more WebRTC browser session capabilities of the second device associated with the second user connected to the service; and
   wherein the determining the one or more WebRTC browser session capabilities that are supported by the first device comprises:
   determining which of the one or more WebRTC browser session capabilities that are supported by both the first device and the second device based on the received indication.

4. The method according to claim 3, further comprising:
   indicating information related to the determined one or more WebRTC browser session capabilities that are supported by both the first device and the second device; and
   wherein the information related to the determined capabilities supported by both the first device and the second device is indicated to the first user in association with an indication of the second user on the user interface, such that the first user can conclude that the indicated information is related to communication with the second user, when using the WebRTC browser service.

5. The method according to claim 1, further comprising:
   establishing a data channel between the first device and a second device;
   transmitting and/or receiving a test message over the established data channel; and
   determining a data throughput between the first device and the second device based on information related to the transmitted and/or received test message.

6. The method according to claim 5, wherein the determining of which the one or more WebRTC browser session capabilities that are supported by the device is further based on the determined data throughput.

7. The method according to claim 1, wherein the determining of which the one or more WebRTC browser session capabilities that are supported is further based on one or more of:
   the location of the first device; and
   statistics from previous service sessions.

8. A first device operating in a communication network, the first device being configured to implement WebRTC and to be associated with a WebRTC browser service applying WebRTC, the first device further being configured to be associated with a first user being connected to the WebRTC browser service, the first device comprising:
   a processor adapted to:
      create an RTCPeerConnection object to provide access to one or more media stream sources of the first device, and further adapted to instruct the RTCPeerConnection object to create an RTCSessionDescription, SDesc_1, for a WebRTC browser session containing audio and video components from the one or more unattached media stream sources of the first device, the one or more unattached media stream sources are not associated with access to an audio or multimedia device of the first device and do not require use of Application Programming Interfaces (APIs) associated with access to the audio or multimedia device of the first device;
      determine one or more WebRTC browser session capabilities that are supported by the first device based on information in the SDesc_1;
      indicate information related to the determined one or more WebRTC browser session capabilities to the first user on a user interface of the first device;
      receive, at the user interface, a selection by the first user of a type of user communication associated with the information to establish the WebRTC browser session with a second device associated with a second user being connected to the WebRTC browser service; and
      establish the WebRTC browser session with the second device using the selected type of user communication, thus enabling the first user, when using the WebRTC browser service, to select a type of user communication, based on the indicated information, that can be provided by the first device during the WebRTC browser session with the second device,
wherein the RTCPeerConnection object and the RTCSessionDescription, SDesc_1 object are Application Programming Interfaces (APIs) of the WebRTC browser service.

9. The first device according to claim 8, wherein the SDesc_1 comprises information on one or more of:
    codecs supported by the first device;
    characteristics associated with codecs supported by the first device;
    IP addresses associated with the first device; and
    network interfaces supported by the first device.

10. The first device according to claim 8, wherein the processor further adapted to:
    receive an indication from a server node, said indication being associated with one or more WebRTC browser session capabilities of the second device associated with a second user connected to the service; and
    wherein the determining the one or more WebRTC browser session capabilities that are supported by the first device comprises determining which of the one or more WebRTC browser session capabilities that are supported by both the first device and the second device based on the received indication.

11. The first device according to claim 8, wherein the processor is further adapted to:
    indicate information related to the determined one or more WebRTC browser session capabilities that are supported by both the first device and the second device; and
    wherein the information related to the determined capabilities supported by both the first device and the second device is indicated to the first user in association with an indication of the second user on the user interface, such that the first user can conclude that the indicated information is related to communication with the second user, when using the WebRTC browser service.

12. The first device according to claim 8, wherein the processor is further adapted to:
    establish a data channel between the first device and a second device;
    transmit and/or receive a test message over the established data channel; and
    determine a data throughput between the first device and the second device based on information related to the transmitted and/or received test message.

13. The first device according to claim 12, wherein the determining of which the one or more WebRTC browser session capabilities that are supported by the device is further based on the determined data throughput.

14. The first device according to claim 8, wherein the determining of which the one or more WebRTC browser session capabilities that are supported is further based on one or more of:
    the location of the first device; and
    statistics from previous service sessions.

15. A method performed by a server node in a communication network, the server node being configured to implement WebRTC and to be associated with a WebRTC browser service applying WebRTC to establish a WebRTC browser session between a first device and a second device configured to implement WebRTC, the method comprising:
    receiving a first RTCSessionDescription, SDesc_1, from the first device associated with a first user connected to the WebRTC browser service;
    receiving a second RTCSessionDescription, SDesc_2, from the second device associated with a second user connected to the WebRTC browser service;
    determining information related to one or more WebRTC browser capabilities supported by both the first device and the second device based on SDesc_1 and SDesc_2 for establishing the WebRTC browser session between the first device and the second device comprising at least one unattached media stream source from one of the first device and the second device, the at least one unattached media stream source not associated with access to an audio or multimedia device of one of the first device and the second device and do not require use of Application Programming Interfaces (APIs) associated with access to the audio or multimedia device of the first device;
    communicating the determined information to at least one of the first and the second device to indicate to the first user and the second user the one or more WebRTC capabilities supported by both the first device and the second device;
    receiving a selection of a type of user communication associated with the determined information from at least one of the first and the second device to establish the WebRTC browser session; and
    establishing the WebRTC browser session using the selected type of user communication between the first device and the second device,
    wherein the RTCSessionDescription, SDesc_1 and the RTCSessionDescription, SDesc_2 are Application Programming Interfaces (APIs) of the WebRTC browser service.

16. The method according to claim 15, wherein the respective RTCSessionDescripton from the first and second devices comprises information on one or more of:
    codecs supported by the first and second devices;
    characteristics associated with codecs supported by the first and second devices;
    IP addresses associated with the first and second devices; and
    network interfaces supported by the first and second devices.

17. The method according to claim 15, wherein the determined information related to the one or more WebRTC browser capabilities comprises information on one or more of:
    codecs supported by both the first and the second device;
    characteristics associated with codecs supported by both the first and the second device;
    network interfaces supported by both the first and the second device; and
    a type of real-time communication supported by both the first and the second device.

18. The method according to claim 15, wherein the determining information related to the one or more WebRTC browser capabilities that are supported by both the first device and the second device is further based on one or more of:
    the location of one of the first and second device; and
    statistics from previous WebRTC browser service sessions.

19. The method according to claim 15, wherein when a WebRTC browser capability is supported only by one of the first and second device, further comprising:
    reserving network functionality and capacity to translate a WebRTC browser capability supported only by one of the first and second devices into a WebRTC browser capability supported by the other device of the first and second devices.

20. A server node operating in a communication network, the server node being configured to implement WebRTC and to be associated with a WebRTC browser service applying WebRTC to establish a WebRTC browser session between a first device and a second device configured to implement WebRTC, the server node comprising:
a processor adapted to:
receive a first RTCSessionDescription, SDesc_1, from the first device associated with a first user connected to the WebRTC browser service; and further adapted to receive a second RTCSessionDescription, SDesc_2, from the second device associated with a second user connected to the WebRTC browser service;
determine information related to one or more WebRTC browser capabilities supported by both the first device and the second device based on SDesc_1 and SDesc_2 for establishing the WebRTC browser session between the first device and the second device comprising at least one unattached media stream source from one of the first device and the second device, the at least one unattached media stream source not associated with access to an audio or multimedia device of one of the first device and the second device and do not require use of Application Programming Interfaces (APIs) associated with access to the audio or multimedia device of the first device;
communicate the determined information to at least one of the first and the second device to indicate to the first user and the second user the one or more WebRTC capabilities supported by both the first device and the second device;
receive a selection of a type of user communication associated with the determined information from at least one of the first and the second device to establish the WebRTC browser session; and
establish the WebRTC browser session using the selected type of user communication between the first device and the second device,
wherein the RTCSessionDescription, SDesc_1 and the RTCSessionDescription, SDesc_2 are Application Programming Interfaces (APIs) of the WebRTC browser service.

21. The server node according to claim 20, wherein the respective RTCSessionDescription from the first and second devices comprises information on one or more of:
codecs supported by the first and second devices;
characteristics associated with codecs supported by the first and second devices;
IP addresses associated with the first and second devices; and
network interfaces supported by the first and second devices.

22. The server node according to claim 20, wherein the determined information related to the one or more WebRTC browser capabilities comprises information on one or more of:
codecs supported by both the first and the second device;
characteristics associated with codecs supported by both the first and the second device;
network interfaces supported by both the first and the second device; and
a type of real-time communication supported by both the first and the second device.

23. The server node according to claim 20, wherein the determining information related to the one or more WebRTC browser capabilities that are supported by both the first device and the second device is further based on one or more of:
the location of one of the first and second device; and
statistics from previous WebRTC browser service sessions.

24. The server node according to claim 20, wherein the processor is further adapted to, when a WebRTC browser capability is supported only by one of the first and second device:
reserve network functionality and capacity to translate a WebRTC browser capability supported only by one of the first and second devices into a WebRTC browser capability supported by the other device of the first and second devices.

25. A computer program product comprising a non-transitory computer readable storage medium storing program code, which when run on a processor in a device causes the device to perform the method according to claim 1.

26. A computer program product comprising a non-transitory computer readable storage medium storing program code, which when run on a processor in a server node causes the server node to perform the method according to claim 15.

27. The method of claim 1, wherein creating an RTCPeerConnection object to provide access to one or more unattached media stream sources of the first device comprises preventing a Navigator.getUserMedia API of the WebRTC browser service from accessing a media stream source of the first device.

28. The method of claim 1, wherein the RTCPeerConnection API and the RTCSessionDescription, SDesc_1 API are WebRTC APIs of an Interactive Connectivity Establishment (ICE) protocol of the WebRTC browser service.

* * * * *